US007061873B2

(12) United States Patent
Ito et al.

(10) Patent No.: US 7,061,873 B2
(45) Date of Patent: Jun. 13, 2006

(54) COMMUNICATION DEVICE WHICH REQUESTS TRANSMISSION OF ENCODED DATA BASED ON MONITORED RECEPTION QUALITY

(75) Inventors: Koichi Ito, Hino (JP); Kentoku Yamaguchi, Hachioji (JP); Nobuhiro Inoue, Hachioji (JP); Yuichi Sato, Tokyo (JP); Kei Sakuma, Hachioji (JP); Seiji Oura, Kawasaki (JP); Tomeo Oka, Yokohama (JP); Yoshihiro Kataoka, Tokyo (JP); Hiroshi Ogasawara, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 862 days.

(21) Appl. No.: 09/926,450

(22) PCT Filed: Mar. 6, 2001

(86) PCT No.: PCT/JP01/01739

§ 371 (c)(1),
(2), (4) Date: Nov. 6, 2001

(87) PCT Pub. No.: WO01/67738

PCT Pub. Date: Sep. 13, 2001

(65) Prior Publication Data

US 2004/0071106 A1 Apr. 15, 2004

(30) Foreign Application Priority Data

Mar. 6, 2000 (JP) .............................. 2000-061213

(51) Int. Cl.
*G01R 31/08* (2006.01)
(52) U.S. Cl. ................................................. 370/252
(58) Field of Classification Search ................ 370/216, 370/229–240, 241–253, 310, 315–327, 328, 370/342, 477, 479, 493–495
See application file for complete search history.

(56) References Cited

U.S. PATENT DOCUMENTS

| 5,774,479 A | * | 6/1998 | Lee et al. .................... 714/749 |
| 5,926,232 A | | 7/1999 | Mangold et al. .................... 1/1 |
| 6,393,060 B1 | * | 5/2002 | Jeong .................... 375/240.19 |
| 6,754,241 B1 | * | 6/2004 | Krishnamurthy et al. ... 370/737 |
| 2001/0010688 A1 | * | 8/2001 | Bi et al. ..................... 370/342 |

FOREIGN PATENT DOCUMENTS

WO   WO 97/26744   7/1997

OTHER PUBLICATIONS

H. Zheng, et al., IEEE, US, vol. Conf. 18, pp. 1231-1235, "QOS Aware Mobile Video Communications", Oct. 31, 1999.

* cited by examiner

*Primary Examiner*—Huy D. Vu
*Assistant Examiner*—Jason Mattis
(74) *Attorney, Agent, or Firm*—Oblon, Spivak, McClelland, Maier & Neustadt, P.C.

(57) ABSTRACT

In this invention, wireless video telephone communication between mobile telephones MS1 and MS2 using the MPEG-2 standard is performed when the reception field strength falls below a threshold value of H continuously for a specific period of T3 or longer in the course of receiving the data at one mobile telephone MS2, the telephone MS2 monitors the restoration of the reception field strength. After detecting the restoration, mobile telephone MS2 transmits a request for the transmission of an I frame to mobile telephone MS1. Upon receipt of the request, mobile telephone MS1 creates an I frame in place of a P frame and transmits the I frame.

4 Claims, 8 Drawing Sheets

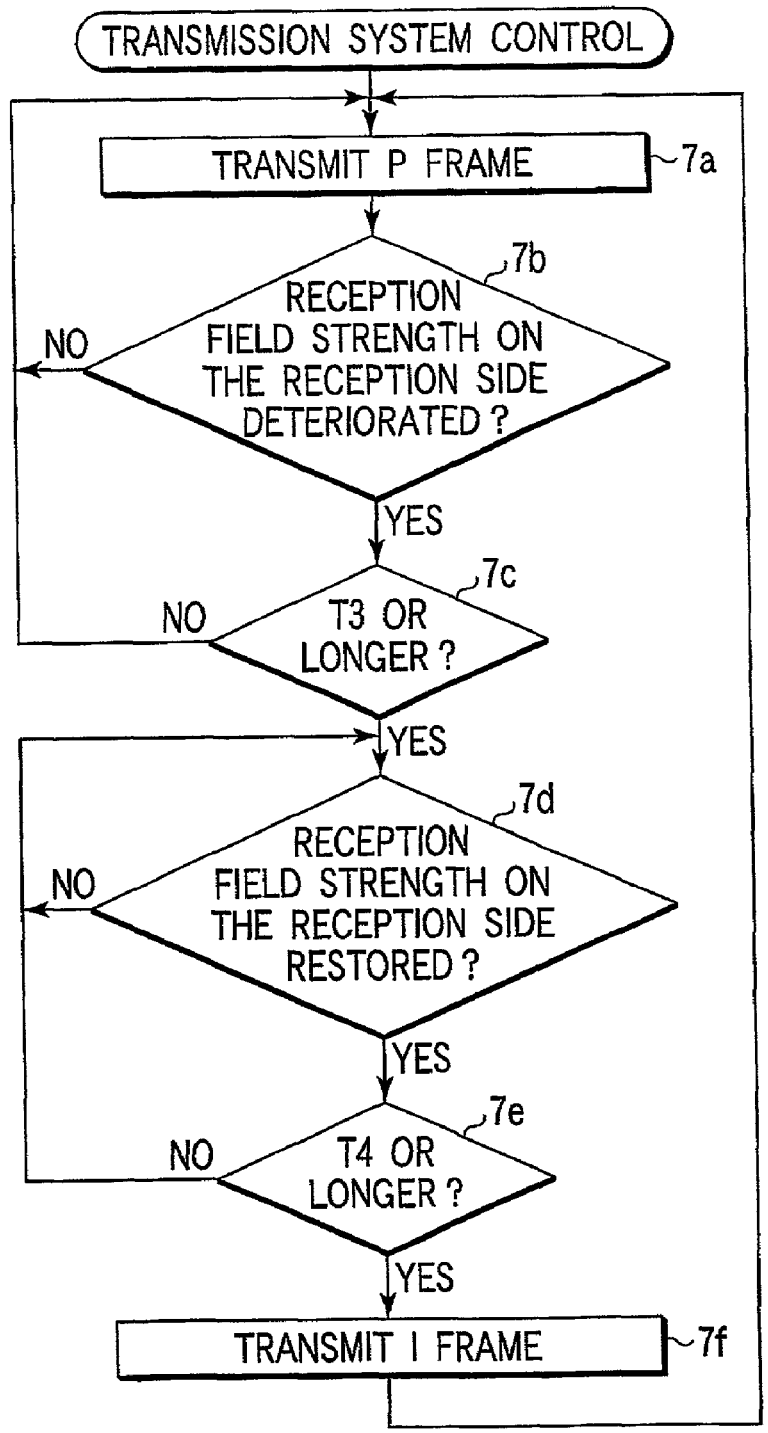
F I G. 7

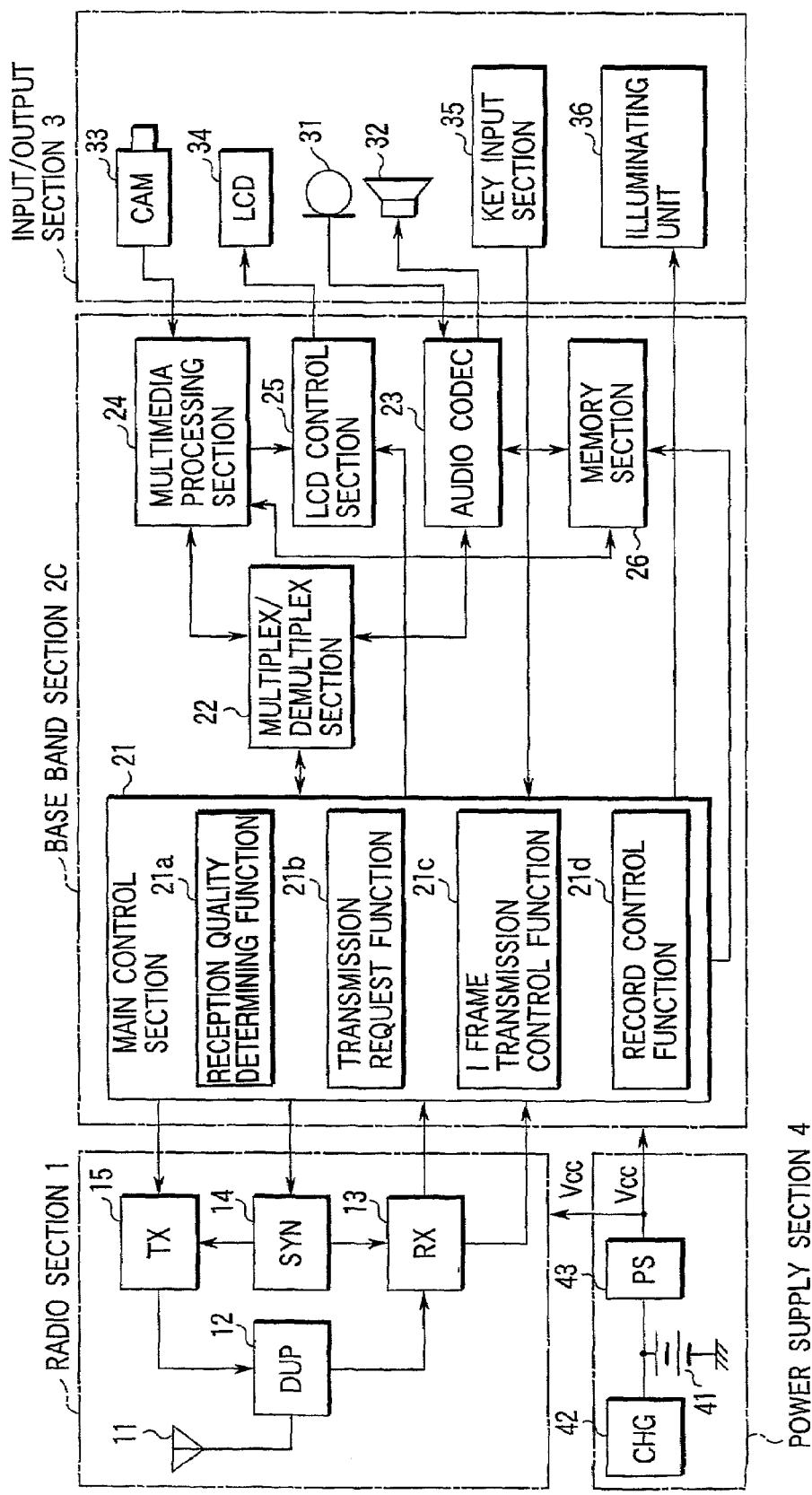
F I G. 8

COMMUNICATION DEVICE WHICH REQUESTS TRANSMISSION OF ENCODED DATA BASED ON MONITORED RECEPTION QUALITY

TECHNICAL FILED

This invention relates to a data transmission system employing a data compression/expansion scheme of transmitting absolute value information in the initial frame and information on the difference from the preceding frame in each subsequent frame and communication devices used in the system.

BACKGROUND ART

In recent years, portable communication terminals, such as mobile telephones or PDAS (Personal Digital Assistants), have begun to make various information transmission services available to people. The information transmission services include audio communication service, SMS (Short Message Service, electronic mail service, and information delivery service using a wireless Internet. In the present mobile communication system, however, if a large amount of data, such as moving picture data, were transmitted, transmission channel band would become a bottleneck, making it impossible to transmit the data as it is.

Thus, to transmit moving picture data by radio, a moving picture compression/expansion process is needed. As one of measures for realizing the process, use of an image compression/expansion scheme called MPEG-4 is under examination.

In MPEG-4, data correlating with each other on the time base, such as moving picture data, are represented by the initial frame and difference frames. The initial frame is referred to as an I frame (Intra-coded Frame) and includes all the image information elements about one screen obtained by compressing a picture into a still picture. That is, an I frame constructs an image frame that makes detect independently by itself.

In contrast, a difference frame is referred to as a P frame (Predictive-coded Frame) and includes mainly information on the difference between the image of the present frame and that of the preceding frame. With the first frame timing after the start of transmission, an I frame is transmitted. With each subsequent frame timing, P frames are transmitted sequentially. Use of MPEG-4 enables moving picture data with the amount of information equivalent to, for example, several Mbps, to be compressed to several tens of Kbps for transmission.

On the other hand, in the mobile communication system, the reception field strength at a mobile station varies greatly, depending on the positional relationship with the base station and its environmental conditions. FIG. 10 shows an example of the great fluctuation. When the reception field strength has dropped below the level represented by a broken line H necessary to secure a specific error rate, the mobile station cannot reproduce the received data properly.

For example, when moving picture data is transmitted using MPEG-4, if a period in which the reception field strength is below the level is relatively short as shown by T1 in the figure, noise appears in the reproduced image only temporarily. If the reception field strength is below the level for a long time as shown by T2 in the figure, however, errors occurred in a plurality of P frames are accumulated one after another. As a result, the quality of the reproduced image deteriorates seriously. Once many errors have been accumulated over a plurality of frames, even if the reception field strength has been restored and a correct P frame is received, a good image cannot be reproduced immediately, because the P frame is information on the difference between the present frame and the preceding frame. Therefore, a lot of time elapses until a good image can be reproduced.

DISCLOSURE OF INVENTION

The object of the present invention is to provide a data transmission system capable of restoring the quality of the received and reproduced data in a short time, even if the quality of the received and reproduced data has deteriorated seriously due to the degradation of transmission quality, and communication devices used in the system.

The foregoing object is accomplished by providing a data transmission system which causes the transmission side to express a original data having correlation on the time base as first data making detect independently and second data made up mainly of the difference from the original data and transmit the resulting data in a time-division manner over a transmission channel and then causes the reception side to receive the first data and subordinated data transmitted via the transmission channel and, on the basis of these data, reconstruct the original data, and which, when monitoring the quality of the transmission channel in the course of transmitting the original data and detecting the deterioration of the quality of the channel to a specific state on the basis of the result of the monitoring, causes the transmission side to transmit the first data to the reception side in place of the second data after the quality of the transmission has been restored.

Specifically, the following various configuration can be considered.

In one configuration, the reception side monitors the reception quality of the first data and second data (encoded data) transmitted via the transmission channel and, on the basis of the result of the monitoring, detects the deterioration of the reception quality and the restoration of the reception quality. After the restoration of the reception quality has been detected, the reception side notifies the transmission side of a request for the transmission of the first data. Then, according to the request for the transmission, the transmission side transmits the first data to the reception side in place of the second data.

In another configuration, the reception side monitors the reception quality of the data transmitted via the transmission channel and notifies the transmission side of the monitored information. On the basis of the monitored information notified by the reception side, the transmission side detects the deterioration of the reception quality on the reception side and the restoration of the reception quality.

After the restoration of the reception quality has been detected, the transmission side transmits the first data to the reception side in place of the second data.

In still another configuration, when two-way data transmission between the transmission side and the reception side is performed, the transmission side estimates the reception quality of the data on the reception side on the basis of the reception quality of the data transmitted from the reception side and detects the deterioration of the reception quality on the reception side and the restoration of the reception quality on the basis of the result of the estimation. After the restoration of the reception quality has been detected, the transmission side transmits the first data to the reception side in place of the second data.

Therefore, with the present invention, even if the transmission quality of the channel has deteriorated for a long time and consequently the quality of the data reproduced on the reception side has deteriorated seriously, the transmission side transmits the first data to the reception side in place of the second data after the restoration of the transmission quality has been detected. As a result, the reception side restarts reproducing the data on the basis of the first data transmitted from the transmission side, after the transmission quality has been restored. This makes it possible to restore the quality of the received playback data to the good quality before the restoration in a short time.

Particularly in a radio data transmission system using a radio communication circuit, the reception field strength at a mobile station varies sharply as the mobile station moves. As a result, the data reception quality deteriorates frequently. The transmission side, however, transmits the first data to the reception side automatically each time the data transmission quality has been restored after the deterioration of the data transmission quality as described above. This makes it possible to always restore the quality of the reception playback data quickly after the restoration of the transmission 5 quality, which is quite effective in radio communication.

Furthermore, in a wire data transmission system using a cable circuit or the like, when the data transmission quality has temporarily deteriorated seriously due to a poor contact of the connector of the cable circuit or the incoming of external noise from the open terminals, the quality of the received playback data can be automatically restored immediately after the data transmission quality has been restored, which is helpful in maintenance.

BRIEF DESCRIPTION OF DRAWINGS

FIG. 7 is a flowchart to help explain the control procedure for the transmission system of the mobile telephone shown in FIG. 6;

FIG. 8 is a block diagram showing the functional configuration of a mobile telephone according to a third embodiment of the present invention;

BEST MODE FOR CARRYING OUT OF THE INVENTION

A first embodiment of a data transmission system related to the present invention and communication devices thereof is as follows.

In a mobile communication system, when a reception field strength is below the threshold value continuously for a specific period of time during data reception at a mobile telephone in the course of making wireless video telephone communication between mobile telephones using the MPEG-4 image compression scheme, the restoration of the reception field strength is monitored. When the restoration has been detected, the mobile telephone receiving a MPEG-4 image data transmits a request for the transmission of an I frame or an I-frame transmission request to the mobile telephone which communicates with the receiving mobile telephone. Receiving the request, the communicated mobile telephone transmits an I frame in place of a P frame.

Figure 1:
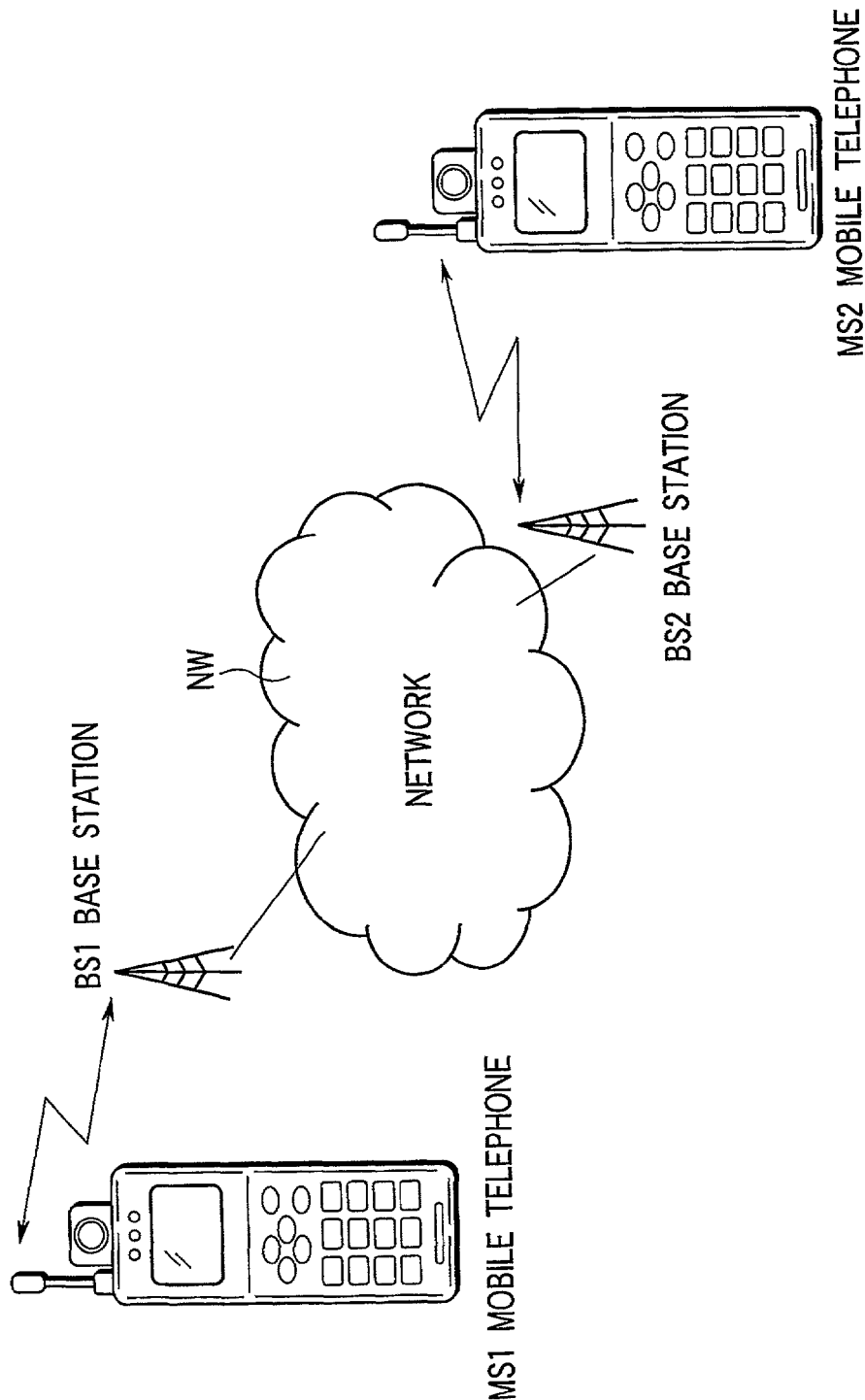
FIG. 1 schematically shows the configuration of a mobile communication system, a first embodiment of a data transmission system related to the present invention.

FIG. 1 schematically shows the configuration of a mobile communication system according to the first embodiment. In FIG. 1, in the service area the system covers, a plurality of base stations BS1, BS2, . . . are placed in such a manner that they are distributed.

These base stations BS1, BS2, are each connected to a network NW. Mobile telephones MS1, MS2, are each connected via radio channels to nearby base stations BS1, BS2, which further connect them to the network NW.

In the network NW, the process of switching between the mobile telephones MS1, MS2 on the calling party side and called party side is carried out according to the calling request of the mobile telephones MS1, MS2. Then, after a communication link is established by the switching process between the mobile telephones MS1, MS2 video telephone communication is possible between these mobile telephones MS1, MS2.

As a radio access scheme, for example, the W-CDMA (Wideband-Code Division Multiple Access) scheme is used. As another radio access scheme, the cdma 2000 scheme, the FDMA scheme, the TDMA scheme, or a narrow-band CDMA scheme may be used.

Figure 2:
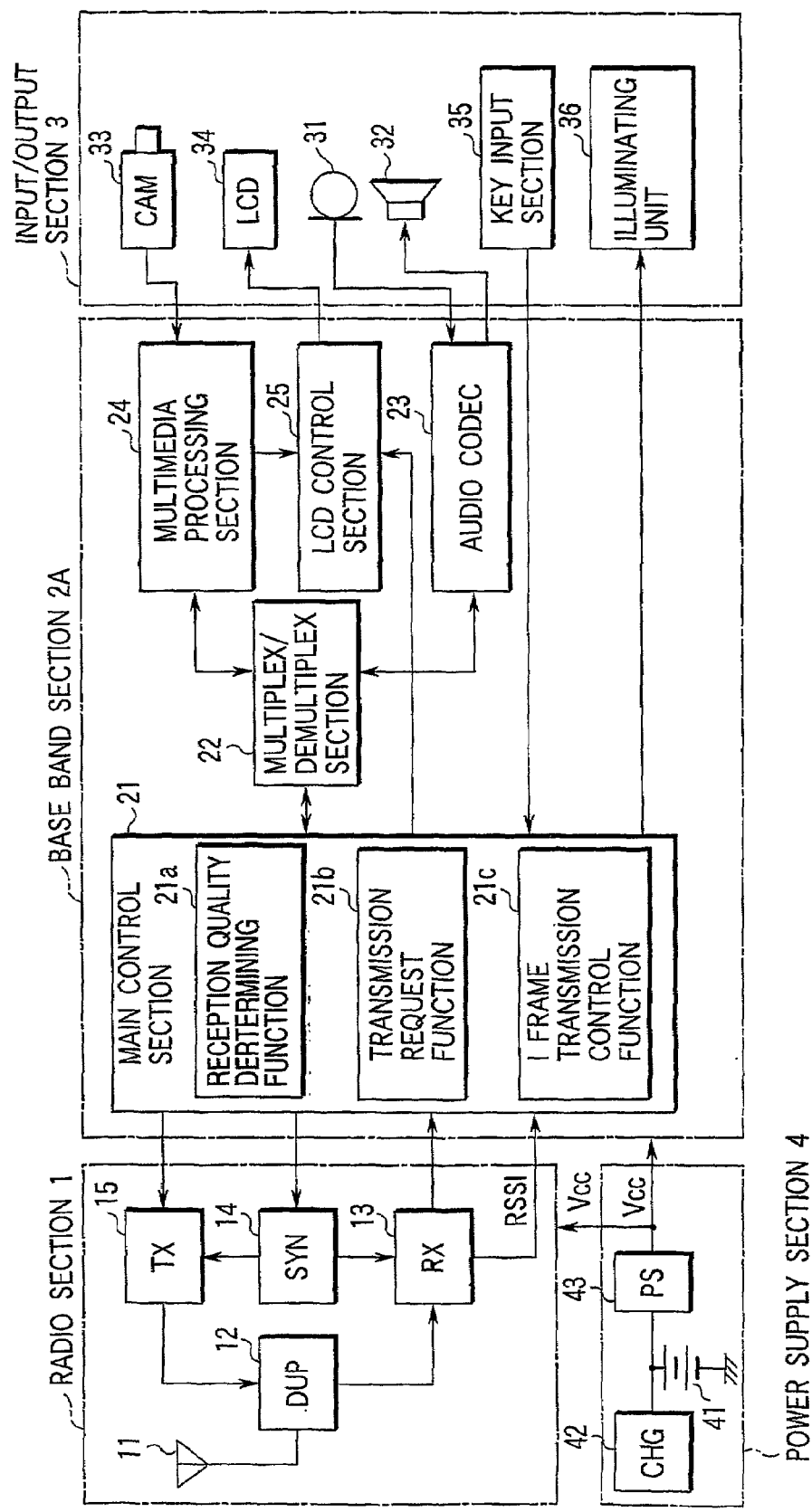
FIG. 2 is a block diagram showing the functional configuration of the mobile telephone in the system of FIG. 1.

Each of the mobile telephones MS1, MS2, . . . is constructed as follows. FIG. 2 is a block diagram showing its functional configuration.

Each of the mobile telephones MS1, MS2, is composed of a radio section 1, a baseband section 2A, an input/output section 3, and a power supply section 4.

In FIG. 1, the radio frequency signal arrived via a radio channel for mobile communication systems from the base stations BS1, BS2, is received by an antenna 11 and then inputted via an antenna duplexer (DUP) 12 to a receiving circuit (RX) 13. The receiving circuit 13 includes a low-noise amplifier, a frequency converter, and a demodulator.

After the low-noise amplifier amplifies the radio signal, the frequency converter mixes the amplified signal with the reception local oscillating signal, thereby downconverting the signal into a reception intermediate frequency signal or a reception baseband signal. The demodulator digital demodulates the output signal of the frequency converter. Demodulation is performed in such a manner that it is separated into primary demodulation and secondary demodulation. In the primary demodulation scheme, spectrum inverse diffusion using diffusion code is used. In the secondary demodulation, an orthogonal demodulation scheme corresponding to, for example, the QPSK (Quadriphase Phase Shift Keying) scheme is used. The reception local oscillating signal is generated by a frequency synthesizer (SYN) under the control of a main control section 21.

The decoded data outputted from the decoder is inputted to a baseband section 2A. The baseband section 2A includes the main control section 21, a multiplex/demultiplex section 22, an audio coding/decoding section (hereinafter, referred to as an audio codec) 23, a multimedia processing section 24, a liquid-crystal display control section 25, and a memory section 26 for recording the received data.

The main control section 21 determines whether the demodulated data is control information or multimedia information. If the result of the determination has shown that the demodulated data is multimedia information, it is inputted to the multiplex/demultiplex section 22, which separates the data into received audio data and received video data. The received audio data is inputted to the audio codec 23, which decodes the data into an audio signal.

The decoded audio signal is outputted by a speaker 32 in the input/output section 3.

In contrast, the received video data is inputted to the multimedia processing section 24, which demodulates the data. The demodulated video signal is inputted via the liquid-crystal display control section 25 to a liquid-crystal display (LCD) 34 in the input/output section 3A, which displays the data. On the LCD 34, various types of information representing the operating states of its own device outputted from the main control section 21 are also displayed.

The pieces of information displayed on the LCD include, for example, a telephone directory, the detected value of the reception field strength, and the remaining electricity of the battery.

When a video recording instruction is inputted from a key input section 35, the received audio data and received video data are recorded in the memory section 26 under the control of the main control section 21.

On the other hand, the speech audio signal of the user using the mobile telephone outputted from a microphone 31 in the input/output section 3 is inputted to the audio codec 23 of the baseband section 2A, which audio codes the speech audio signal and inputs the resulting signal to the multiplex/demultiplex section 22. The video signal outputted from a camera (CAM) 33 is inputted to the multimedia processing section 24 of the baseband section 2A, which subjects the video signal to image coding and inputs the resulting signal to the multiplex/demultiplex section 22. The multiplex/demultiplex section 22 multiples the coded audio data and video data according to a specific format determined in ITU-T H.223 or the like. The multiplexed transmission data is inputted from the main control section 21 to the transmitting circuit (TX) 15 of the radio section 1.

The transmitting circuit 15 includes a modulator, a frequency converter, and a transmission power amplifier. The modulator digital modulates the transmission intermediate frequency signal according to the transmission data. Modulation is performed in such a manner that it is separated into primary modulation and secondary modulation. In the primary modulation, for example, the QPSK scheme is used. In the secondary modulation, a scheme of performing spectrum diffusion of the primary-modulated signal using diffusion code is used. The frequency converter mixes the transmission intermediate frequency signal modulated by the modulator with the transmission local oscillating signal, thereby upconverting the frequency signal to a radio frequency signal in terms of frequency. The transmission local oscillating signal is generated by the frequency synthesizer 14 under the control of the main control section 21.

The transmission radio frequency signal outputted from the frequency converter is amplified by the transmission power amplifier to a specific transmission level specified by the main control section 21. Then, the amplified signal is supplied via the antenna duplexer 12 to the antenna 11, which radiates the signal to the base stations (not shown).

The power supply section 4 includes a battery 41 using, for example, a lithium ion battery, a charging circuit 42 for charging the battery 41, and a voltage generating circuit (PS) 43. The voltage generating circuit 43 is composed of, for example, a DC/DC converter and generates a specific power-supply voltage Vcc on the basis of the output voltage of the battery 41.

The input/output section 3 includes an illuminating unit 36. The illuminating unit 36 is referred to, for example, backlight or illumination. When the user operates the keys or is in communication, it illuminates the LCD 34 and key input section 35.

The main control section 21 includes a microprocessor and an internal memory composed of a ROM and a RAM or the like. In terms of control functions, the main control section 21 has not only the normal control functions, including the radio channel connection control function and communication control function, but also the following new functions: a reception quality determining function 21a, a transmission request function 21b, and an I-frame transmission control function 21c. These control functions are realized by the control program stored in the ROM.

The reception quality determining function 21a monitors the reception field strength of the radio frequency signal arriving in wireless video telephone communication from base station BS1 or BS2 to which the telephone is being connected. Then, on the basis of the detected value of the reception field strength, the reception quality determining function 21a carries out a first determining process and a second determining process. In the first determining process, it is determined whether the reception field strength has dropped continuously below the threshold value H for a specific period of time. In the second determining process, if the first determining process has detected the drop in the reception field strength, it is determined whether the reception field strength has been restored to the threshold value H or more continuously for longer than a specific period of time.

When the reception quality determining function 21a has detected that the reception field strength dropped below the threshold value H continuously for the specific period of time and thereafter has been recovered to the threshold value H or more continuously for the specific period of time, the transmission request function 21b transmits an I-frame transmission request to a mobile telephone which transmits a MPEG-4 image data.

The I-frame transmission control function 21c monitors the arrival of the I-frame transmission request from mobile telephone. Then, when receiving the request, the I-frame transmission control function 31c creates an I frame according to the request and transmits the I frame in place of a P frame.

Figure 3:
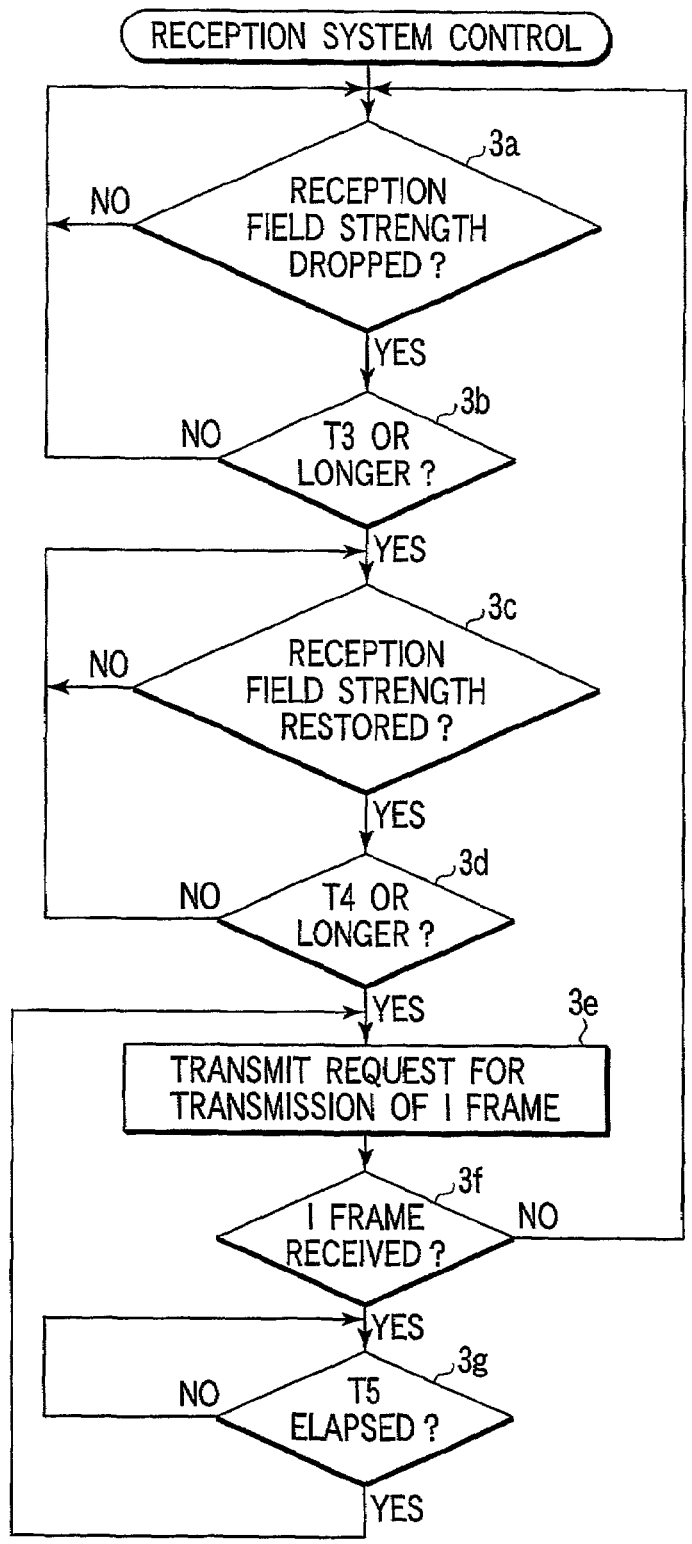
FIG. 3 is a flowchart to help explain the control procedure for the reception system of the mobile telephone shown in FIG. 2.
Figure 4:
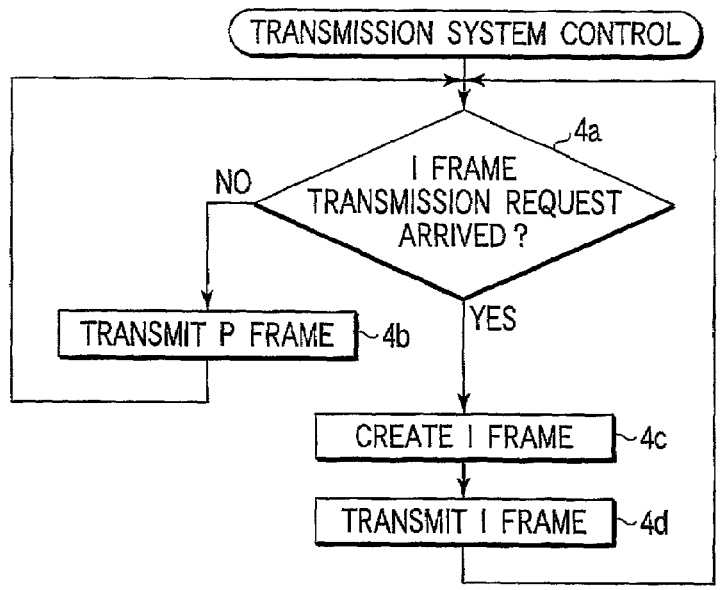
FIG. 4 is a flowchart to help explain the control procedure for the transmission system of the mobile telephone shown in FIG. 2.

The operation of the system constructed as described above and the mobile telephones MS1 and MS2 will be explained. FIG. 3 is a flowchart to help explain the control procedure for the reception system of the mobile telephones MS1 and MS2. FIG. 4 is a flowchart to help explain the control procedure for the transmission system of the mobile telephones MS1 and MS2.

For example, it is assumed that wireless video telephone communication is being carried out between mobile telephone MS1 and mobile telephone MS2. In this state, the main control section 21 of each of the mobile telephones MS1 and MS2 causes the reception quality determining function 31a to monitor the reception field strength. The reception field strength is monitored by A/D converting the output voltage of a reception field strength sensor provided in the receiving circuit 13, supplying the resulting voltage to the main control section 21, and comparing the RSSI value with the preset threshold value H at the main control section 21.

In this state, for example, it is assumed that a drop in the reception field strength has been detected in mobile telephone MS2. Then, when the main control section 21 of mobile telephone MS2 has detected the drop in the reception field strength at step 3a as shown in FIG. 3, it passes control to step 3b, where it determines whether the reception field strength has dropped continuously below the threshold value H for a specific time of T3 or longer. Then, for example, as shown in FIG. 5 where the reception field strength dropped in the period T1, when the reception field strength drops below the threshold value H and then is restored to the threshold value H or more in a very short time, the main control section 21 ignores the drop in the reception field strength and returns to the monitoring of a drop in the reception field strength at step 3a.

Figure 5:
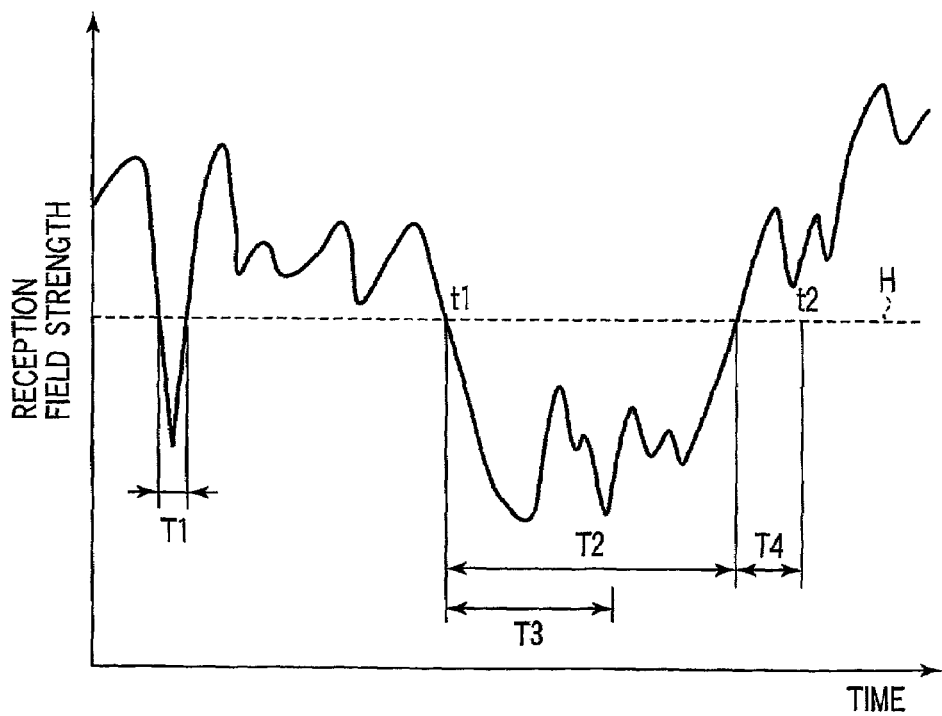
FIG. 5 shows an example of variations in the reception field strength.

In contrast, as shown in FIG. 5 where the reception field strength dropped in the period T2, when the reception field strength is below the threshold value H continuously longer than the period T3, the main control section 21 of mobile telephone MS2 passes control to step 3c, where it monitors the restoration of the reception field strength. Then, when the reception field strength returns to the threshold value H or more as shown in FIG. 5 and this state continues for the period T4 or longer, it is determined that the reception field strength has been definitely restored and control proceeds from step 3d to step 3e. Then, at step 3e, the main control section 21 creates an I-frame transmission request and transmits the transmission request to the mobile telephone MS1.

Additionally, the main control section 21 of mobile telephone MS2 monitors the arrival of an I frame from the mobile telephone MS1 at step 3f after the transmission request has been transmitted. Then, when no I frame has been received even if a specific period of T5 has elapsed after the transmission request was transmitted, control is returned from step 3g to step 3e, where the main control section 21 transmits the I frame transmission request again. Thereafter, the I frame transmission request is transmitted repeatedly at intervals of time T5 until the reception of an I frame from mobile telephone MS1 has been recognized.

On the other hand, the main control section 21 of the mobile telephone MS1 monitors the arrival of an I frame transmission request at step 4a as shown in FIG. 4, while making wireless video telephone communication. Then, the main control section 21 creates a P frame at step 4b and transmits the P frame until an I frame transmission request has arrived. The P frame is created by calculating the difference between the video data of the preceding frame and that of the present frame at the multimedia processing section 24.

In contrast, for example, it is assumed that an I frame has arrived from the mobile telephone MS2. Then, the main control section 21 of mobile telephone MS1 passes control to step 4c, where it creates an I frame. The main control section 21 then transmits the I frame in place of the P frame to the mobile telephone MS2 at step 4d.

When receiving the I frame, mobile telephone MS2 interrupts the image reproducing process it is carrying out on the basis of the P frame.

Then, mobile telephone MS2 reproduces one image data on the basis of the video data of the received I frame.

The above explanation has been given using the case where the reception field strength has deteriorated in mobile telephone MS2. Similar control is also performed when the reception field strength has deteriorated in mobile telephone MS1.

As described above, in the first embodiment, when wireless video telephone communication is effected using MPEG-4 between the mobile telephones MS1 and MS2, if the reception field strength in one mobile telephone MS2 has dropped below the threshold value H continuously for the specific period T3 or longer during data communication, mobile telephone MS2 monitors the restoration of the reception field strength. When detecting the restoration, mobile telephone MS2 transmits an I frame transmission request to mobile telephone MS1. Receiving the transmission request, mobile telephone MS1 creates an I frame and transmits the I frame in place of a P frame.

Therefore, with this mobile communication system and its mobile telephones, even when the reception field strength has dropped and the quality of the received playback image has deteriorated temporarily, an I frame is transmitted immediately after the restoration of the reception field strength, which enables the received playback image to be restored to an image of good quality quickly.

For example, if the restoration recognizing time T4 of the reception field strength is about 0.1 second and the time from when an I frame transmission request is transmitted until the I frame is received and its video data is reproduced is 0.2 second, the quality of the received playback data can be restored in about 0.3 second from the time when the reception field strength is restored.

Furthermore, setting the restoration recognizing period T4 for the reception field strength lead to the advantage of making it possible to detect the restoration of the reception field strength more reliably.

Second Embodiment

In a second embodiment of the present invention, when wireless video telephone communication is performed between mobile telephones using an MPEG-4 image compression scheme in a mobile communication system, the detect data about the reception field strength detected by a mobile telephone which receive a MPEG-4 image data during data reception is notified to a mobile telephone which transmits a MPEG-4 image data.

Then, the mobile telephone on the transmission side monitors a drop in and the restoration of the reception field strength at the receiving mobile telephone on the basis of the notified reception field strength detect data. When detecting the restoration, the transmitting mobile telephone transmits an I frame to the mobile telephone on the reception side in place of a P frame.

Figure 6:
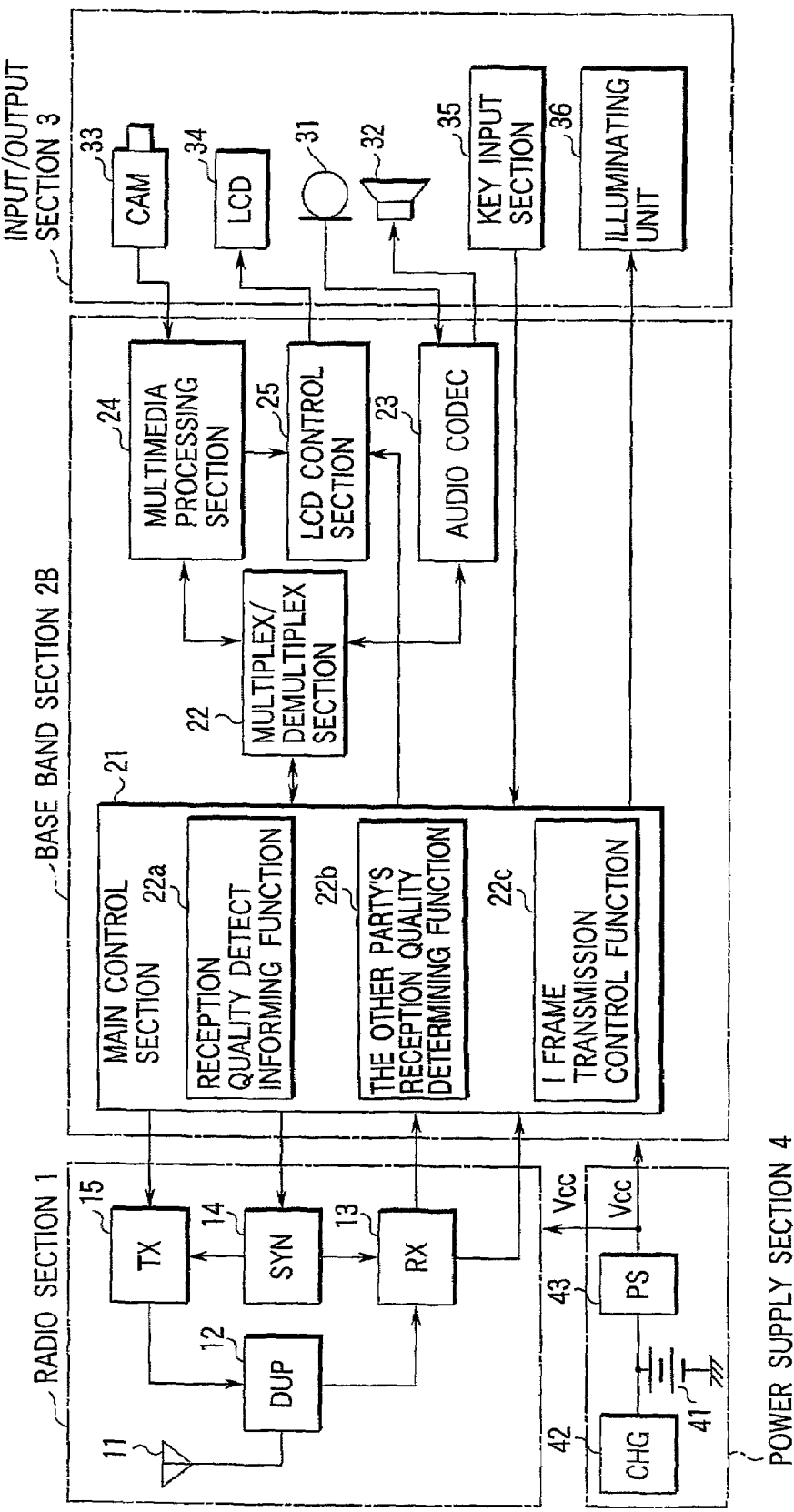
FIG. 6 is a block diagram showing the functional configuration of a mobile telephone according to a second embodiment of the present invention.

FIG. 6 is a block diagram showing the functional configuration of a mobile telephone according to the second embodiment. In FIG. 6, the same parts as those in FIG. 2 are indicated by the same reference numerals and a detailed explanation of them will not be given.

The main control section 21 of the baseband section 2B includes a reception quality detect informing function 22a, the other party's reception quality determining function 22b, and an I frame transmission control function 22c.

The reception quality detect informing function 22a takes in the voltage value of the reception field strength detected by the reception field strength sensor of the receiving circuit 13 in the course of receiving the data. On the basis of the voltage value, the reception quality detect informing function 22a creates notice data about the detected value of the reception field strength and transmits the notice data to a mobile telephone.

The reception quality determining function 22b receives the notice data about the detected value of the reception field strength arrived from a mobile telephone. On the basis of the notice data, the reception quality determining function 22b monitors the reception quality at the mobile telephone. What is monitored includes whether the reception field strength is below the threshed value H continuously for a specific length of time and whether, after the drop is detected, the reception field strength is restored to the threshold value H or more continuously longer than a specific length of time.

When the reception quality determining function 22b has detected that the reception field strength dropped below the threshold value H continuously for the specific length of time at the mobile telephone and thereafter has been restored to the threshold value H or more continuously longer than the specific length of time, the I frame transmission control function 22c creates an I frame. Then, the I frame transmission control function 22c transmits the I frame to the mobile telephone in place of a P frame.

With such a configuration, for example, when the mobile telephones MS1 and MS2 are performing video telephone communication with each other, the main control section 21 of each of the mobile telephones MS1 and MS2 not only monitors the other party's reception field strength but also performs transmission control of I frames on the basis of the result of the monitoring as explained below. FIG. 7 is a flowchart to help explain the procedure for the control.

Specifically, during wireless video telephone communication, the main control section 21 of each of the mobile telephones MS1 and MS2 is monitoring the deterioration of the reception quality on the basis of the detected value of the reception field strength reported from the mobile telephones MS2, MS1 at step 7b. During the period in which the reception quality is keeping good level, the main control section 21 creates a P frame in the frame period at step 7a.

Now, it is assumed that, in this state, the reception field strength has dropped at mobile telephone MS2. Then, the main control section 21 of mobile telephone MS1 communicating with mobile telephone MS2 monitors whether the drop in the reception field strength has lasted for the specific length of time T3 or longer. If the drop in the reception field strength has lasted for the specific length of time T3 or longer, the main control section 21 passes control to step 7d, where it monitors whether the reception field strength has returned to the threshold value H or more. If the reception field strength has returned to the threshold value H or more, the main control section 21 determines whether the restoration of the reception field strength lasts for the specific length of time T4 or longer at step 7e. If the judgment has shown that the restoration of the reception field strength has lasted for the specific length of time T4 or longer, the main control section 21 determines that the reception field strength has been restored securely and passes control to step 7f. At step 7f, the main control section 21 creates an I frame and transmits the I frame to the mobile telephone MS2 in place of the P frame.

Accordingly, as with the first embodiment, with the second embodiment, even if the reception field strength drops at the mobile telephones MS1 and MS2 and the quality of the received playback image deteriorates temporarily, the I frame will be transmitted immediately after the reception field strength has been restored. Therefore, it is possible to restore the received playback image quickly to an image of good quality.

Furthermore, in the second embodiment, the mobile telephone on the reception side has only to transmit the notice data about the detected value of the reception field strength to the mobile telephone on the transmission side. This makes it unnecessary to use the function of transmitting and receiving the I frame transmission request, which helps simplify the control sequence accordingly.

Third Embodiment

In a third embodiment of the present invention, each mobile telephone has a record control function for received data in addition to the control functions explained in the first embodiment. When the record control function has detected the deterioration of the reception field strength at its own telephone, it retrieves the video data received and recorded from the time when the deterioration was detected until the I frame has arrived from the mobile telephone after the restoration of the reception field strength, and deletes the retrieved video data from the recording memory.

FIG. 8 is a block diagram showing the functional configuration of a mobile telephone according to the third embodiment. In FIG. 8, the same parts as those in FIG. 2 are indicated by the same reference numerals and a detailed explanation of them will not be given.

The baseband section 2C includes a memory section 26. The memory section 26 is composed of, for example, a flash EEPROM and used to record received video data and received audio data.

The main control section 21 of the baseband section 2C has not only the reception quality determining function 21a, transmission request function 21b, and I-frame transmission control function 21c but also a record control function 21d. These functions are the control functions related to the present invention.

For example, when the record mode of received data has been set from the key input section 35, the record control function 21d stores the reproduced video data decoded frame by frame at the multimedia processing section 24 into the memory section 26 in sequence.

In place of the reproduced video data, the received I frame data and P frame data before decoding may each be stored. Moreover, the audio data decoded at the audio codec 23 or the audio data before decoding may be stored together with the video data.

When the deterioration of the reception field strength has been detected in the course of recording the received data, the record control section 21d stores the period of time from when the deterioration started until the I frame has been received from the mobile telephone after the restoration of the reception field strength. Then, the record control section 21d carries out the process of retrieving the received data recorded in the memory section 26 during that period and deleting the retrieval data.

With such a configuration, for example, if the record mode has been set from the key input section 35 during wireless video telephone communication, then the main control section 21 of the baseband section 2C gives a record instruction to the memory section 26. Then, the main control section 21 causes the received video data decoded at the multimedia processing section 24 to correspond to the received audio data decoded at the audio codec 23 for each of the frames received from this time on, and stores the resulting data in the memory section 26.

Now, it is assumed that in this state, the reception field strength has deteriorated below the threshold value H due to the influence of, for example, fading. Then, the main control section 21 holds in its internal memory the time that the record control means 21*d* detected the drop in the reception field strength (t1 in the example of FIG. 5). Thereafter, when the reception field strength has returned to the threshold value H or more and the mobile telephone has transmitted an I frame in response to the I frame transmission request, the main control section 21 holds that point of time (t2 in the example of FIG. 5) in such a manner that that point of time is caused to correspond to the drop detect time t1.

Specifically, the period from when the deterioration of the reception field strength was detected until an I frame has been received, that is, T2+T4, is stored. Then, the received video data reproduced on the basis of the P frame received in the reception quality deterioration period T2+T4 and stored in the memory 26 is deleted from the memory section 26.

The deleting process may be carried out after the communication has been completed. In addition, it may be performed when the remaining capacity of the memory section 26 has decreased below a specific amount.

Accordingly, with the third embodiment, the received video data of seriously deteriorated quality received and stored in the memory section 26 when the reception field strength deteriorated can be selectively deleted from the memory section 26 on the basis of the information representing the reception quality deterioration period stored in the internal memory of the main control section 21*d*. This makes it possible to use the storage capacity of the memory section 26 effectively.

Video data particularly has a much larger amount of information than that of audio data and requires a large storage area. By deleting the video data whose picture quality has deteriorated seriously because of a drop in the reception field strength, the memory section 26 with a limited storage capacity can be used effectively.

Other Embodiments

In the first to third embodiments, mobile telephone MS2 on the reception side transmits an I frame transmission request or notice data about the detected value of the reception field strength to mobile telephone MS1. On the basis of the transmission request or notice data about the detected value of the reception field strength, mobile telephone MS1 on the transmission side transmits an I frame to mobile telephone MS2.

The present invention, however, is not limited to the above embodiments. For instance, when the mobile telephones MS1 and MS2 are in two-way communication, each of the mobile telephones MS1 and MS2 estimates the deterioration of the reception quality of the mobile telephones MS2 and MS1 and the restoration of the reception quality on the basis of the result of detecting its own reception quality. Then, when the estimation has detected that the reception quality deteriorated at the mobile telephones MS2 and MS1 and thereafter has been restored, mobile telephone MS1 automatically creates an I frame and transmits the I frame to the mobile telephone MS2 in place of a P frame.

In this approach, since the transmission quality of the up channel does not always coincide with that of the down channel, the determining accuracy of the reception quality deteriorates a little. The mobile telephone MS2 on the reception side, however, need not transmit the I frame transmission request or notice data about the detected value of the reception field strength to mobile telephone MS1 at all. As a result, it is possible to simplify control sequence between the mobile telephones MS1 and MS2 accordingly.

Furthermore, the I frame may be transmitted together with the I frame transmission request to the mobile telephones MS2 or MS1. This makes it possible to receive the I frame from the mobile telephone MS2 or MS1, which enables the received playback image to be recovered from the deterioration quickly.

In addition, while in the above embodiments, the reception quality has been determined on the basis of the reception field strength, it may be determined by detecting the reception bit error rate or the reception frame error rate. These can be realized by providing the modem of the receiving circuit 13 with an error rate measuring circuit, reading the measurement data into the main control section 31, and making a judgment.

Moreover, the deterioration and restoration of the reception quality may be determined by providing the multimedia processing section 24 with the function of detecting an abnormality in the moving picture, reading the data detected by the abnormality detecting function into the main control section 21, and making an analysis. The detecting of an abnormality in the moving picture can be realized by, for example, determining whether the control data representing a P frame can be detected.

Still furthermore, when the deterioration of the reception quality has been detected, an message to tell the deterioration may be displayed on the LCD 34 or outputted in sound from the speaker 32. This enables the user of the telephone to recognize the deterioration of the reception quality.

Additionally, the data transmission system may be so constructed that the user of the telephone who has recognized the deterioration of the reception quality can enter a reception quality recovery request from the key input section 35 and the main control section 21, receiving the recovery request, transmits an I frame transmission request. The timing of transmitting the I frame transmission request may be set to the point of time when the restoration of the reception quality is detected or to the point of time when the restoration acknowledgment period has elapsed as shown in FIG. 5.

The deterioration and restoration of the reception quality do not necessarily need to be detected using the fixed threshold value or time constant. The deterioration and restoration of the reception quality may be detected using different threshold values.

In addition, the threshold value may be changed adaptively on the basis of, for example, the change of the bit rate.

Figure 9:
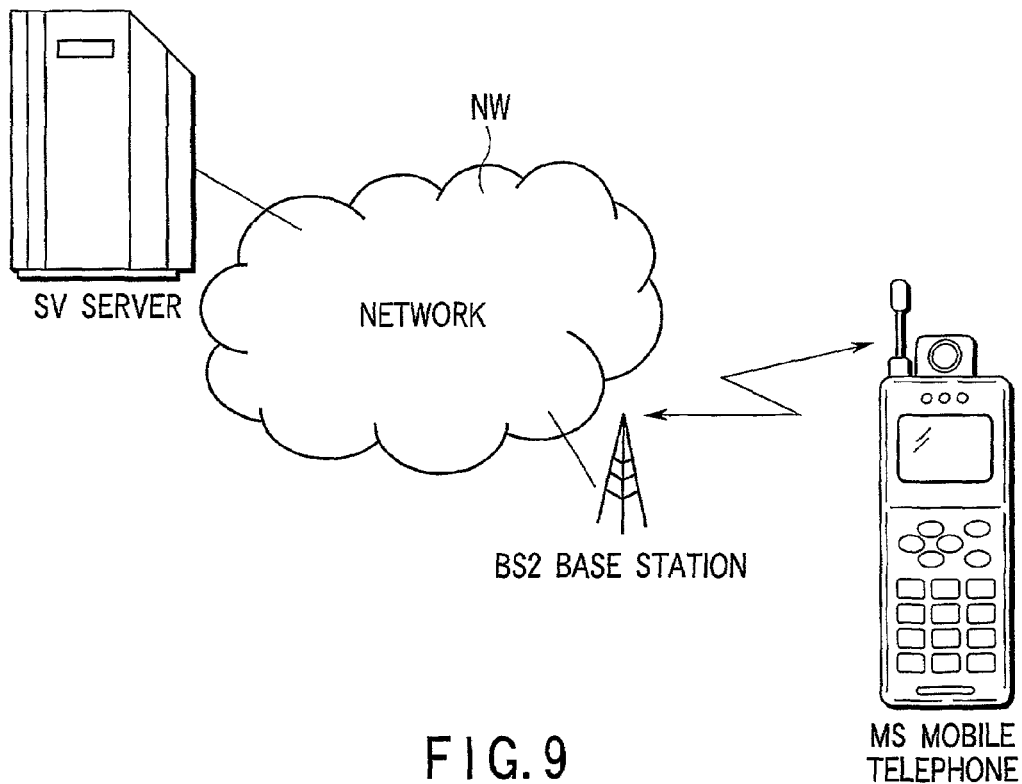
FIG. 9 schematically shows the configuration of an information download system, another embodiment of the data transmission system related to the present invention.
Figure 10:
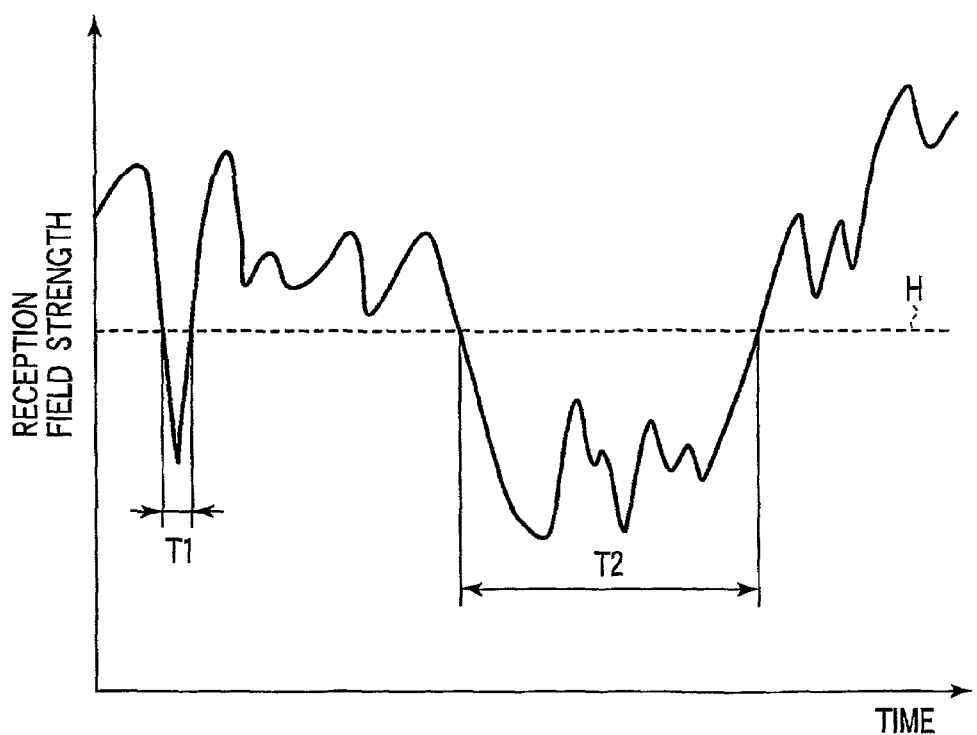
FIG. 10 shows an example of variations in the reception field strength to help explain the prior art.

Still furthermore, in each of the above embodiments, the explanation has been given using the case where wireless video telephone communication is made between the mobile telephones MS1 and MS2. The present invention is not limited to this. For instance, the invention may be applied to the following case: mobile telephones or mobile information terminals similar to mobile telephones are connected to a WWW server SV or the like on the Internet via a network NW as shown in FIG. 9, and then the information or the like on web pages is downloaded from the server SV.

While in the above embodiments, the explanation has been given using portable mobile communication systems. The present invention, however, may be applied to a wireless transmission system between units using a short-distance wireless data communication system, such as wireless LAN or BT (Bluetooth) and further to a cable transmission system. In a case where the present invention is applied to a cable transmission system, when the data transmission quality has temporarily deteriorated seriously due to a poor contact of the connector of the cable or the incoming of external noise from the open terminals, the quality of the received playback data can be automatically restored immediately after the data transmission quality has been restored, which is helpful in maintenance.

Furthermore, as for the type of communication system, its configuration, the control procedures for transmission quality determining means and I frame transmission control means, their contents, and the type of transmission data, the present invention may be practiced or embodied in still other ways without departing from the spirit or essential character thereof.

INDUSTRIAL APPLICABILITY

As has been explained above, with the present invention, it is possible to provide a data transmission system capable of restoring the quality of the received and reproduced data in a short time, even if the quality of the received and reproduced data has deteriorated seriously due to the degradation of transmission quality, and communication devices used in the system.

The invention claimed is:

1. A communication device for receiving encoded data via a transmission channel, the encoded data comprising first data and second data, wherein the first data is generated from one frame of video data and the second data is generated from a difference between frames of the video data, the communication device comprising:

transmission quality monitoring means for monitoring reception quality of received data via the transmission channel;

reception control means for notifying of a request for transmission of the first data if the transmission quality monitoring means detects that the reception quality has restored to a preset second state after the reception quality deteriorated to a preset first state;

recording means for recording the received encoded data or the video data reconstructed by decoding the received encoded data; and record control means for deleting the encoded data or the video data received between the deterioration to the first state and the reception of the first data.

2. The communication device according to claim 1, wherein the record control means deletes the received encoded data or the video data when the communication device receives the first data.

3. The communication device according to claim 1, wherein the record control means deletes the received encoded data or video data after communication is completed.

4. The communication device according to claim 1, wherein the record control means includes means for monitoring the recording capacity of the recording means, and means for deleting the received data or video data if the remaining recording capacity has become below a specific amount.

* * * * *